Patented Feb. 3, 1953

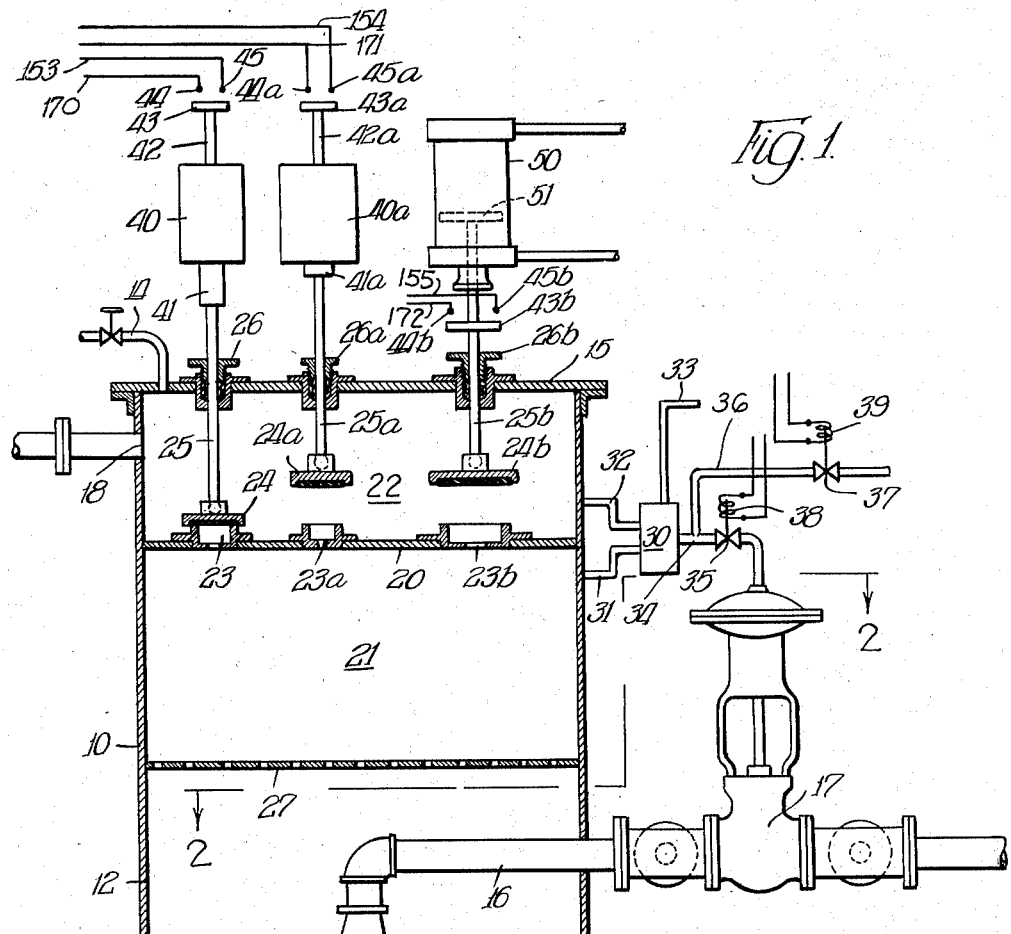

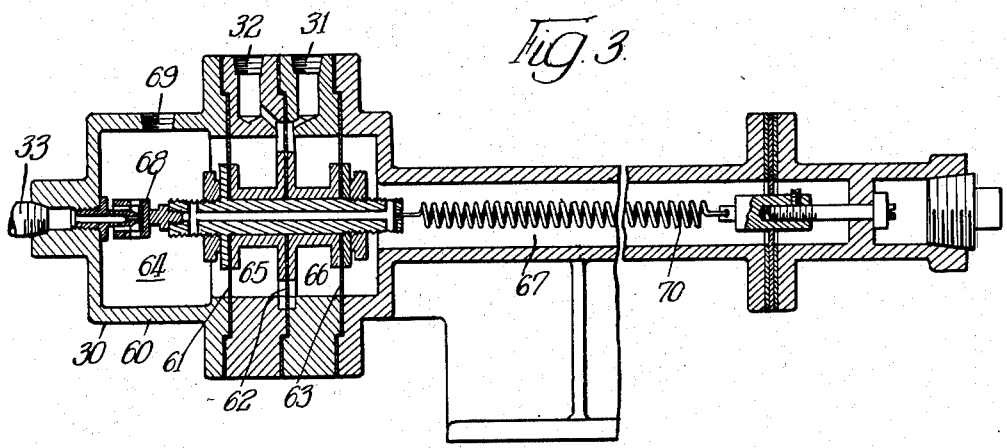
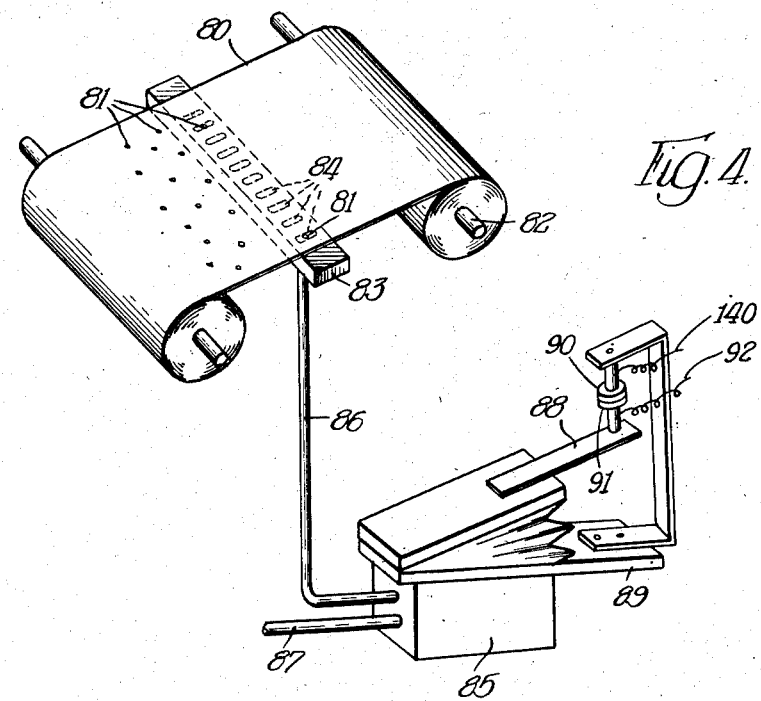

2,627,280

UNITED STATES PATENT OFFICE 2,627,280

FLOW CONTROL SYSTEM

Samuel L. Adelson, Chicago, Ill., assignor to Infilco Incorporated, Chicago, Ill., a corporation of Delaware Application April 21, 1949, Serial No. 88,878

13 Claims. (Cl. 137—501)

This invention relates to an improved flow control system.

It is an object of this invention to provide a flow controller which is simple in construction and reliable in operation and requires a minimum of maintenance.

Another object of the invention is to provide a flow controller which operates with high accuracy over a wide range of flow rates.

A specific object of this invention is to provide a system for controlling the rate of flow of a fluid in accordance with a predetermined program.

A further object is to provide a flow control system wherein the flow programmer may be remotely located from the controller.

A further object of the invention is to provide a simple means in a flow control system whereby the flow rate is indicated at any instant, and whereby indication is immediately given of any departure of the actual flow rate from the then programmed flow rate.

These and other objects will become apparent from a consideration of the description and claims which follow.

The range of control that can be covered by my new system with high accuracy is very wide. It is possible with my system to control program flow rates at 0.5 per cent of the maximum flow rate with an error within 5 per cent of absolute flow, or at 1.0 per cent of the maximum flow rate with an error within 2.5 per cent of absolute flow, with corresponding accuracies at other rates, the accuracies improving as the overall range of flow control decreases.

My new system of flow control comprises a controller located at or near the place of fluid discharge, a programmer, which may be at any suitable location remote from the controller, and suitable electrical connections between the programmer and the controller. The main elements of my controller include a tank, a partition across the tank separating therein an inlet chamber into which a fluid inlet line discharges, from an outlet chamber from which a fluid discharge line leads, a plurality of orifices of suitable diameters in the partition, means for selectively opening and closing one or more of the orifices, and means for maintaining a constant predetermined pressure difference between the upstream and the downstream sides of the orifices. Any suitable means capable of maintaining a predetermined pressure drop across the orifices may be used. For example, these means may include one or more inlet valves between the source of inlet supply and the tank, and means for controlling the degree of opening or closing of the inlet valve or valves.

The inlet valve is of a type wherein the degree of opening of the valve is determined by the pressure admitted to a diaphragm chamber to move a diaphragm and its associated valve mechanism. The greater this pressure the greater will be the valve opening and vice versa. Valves of this type are well known in the art.

The programmer is adapted to control the means for selectively opening and closing one or more of the orifices in correspondence with the programmed rate of flow, and is also adapted to select the controllable inlet valve or valves to be used for different programmed rates. My preferred programmer comprises a roll of suitable material which is perforated to reproduce the flow program, the location of each perforation in a row of perforations corresponding to a definite orifice in the controller. The roll is moved intermittently forwardly so that at uniform time intervals a row of perforations is aligned with electrical or pneumatic means adapted to close an electrical switch or switches, corresponding to the location of the corresponding perforations. Closing of these switches causes opening of the corresponding orifices. At each succeeding interval of forward movement of the roll, a new group of perforations is brought into alignment position. If in the new group one or more perforations have a similar location as perforations of the preceding group, the corresponding switches will remain closed, and consequently the corresponding orifices will remain open. If the new group does not include any perforations corresponding to perforations in the previous group, the switches that were closed by the previous group will open and the corresponding orifices will close. In this manner any number of orifices can selectively be opened and closed or remain open in accordance with the perforations in the roll as determined by a desired rate of flow program. Where a program involves wide variations of the flow rate, I prefer to provide several inlet valves, preferably of different capacity range, and to selectively use one or more of these inlet valves for different ranges of flow. In such case additional perforations are provided in each group of perforations on the moving roll, these additional perforations being aligned to control solenoid operated valves associated with the operating means for the inlet valves.

My invention will be understood more fully by reference to the drawings which form a part hereof, and wherein similar elements in the various figures have been designated by like reference characters.

Figure 1 is a vertical cross sectional view of the controller of my system;

Figure 2 is a sectional view taken along the line 2—2 of Figure 1;

Figure 3 is a cross sectional diagrammatic view of a constant differential regulator for positioning the inlet control valve.

Figure 4 is a perspective view showing diagrammatically the programmer of my system.

Figure 5:
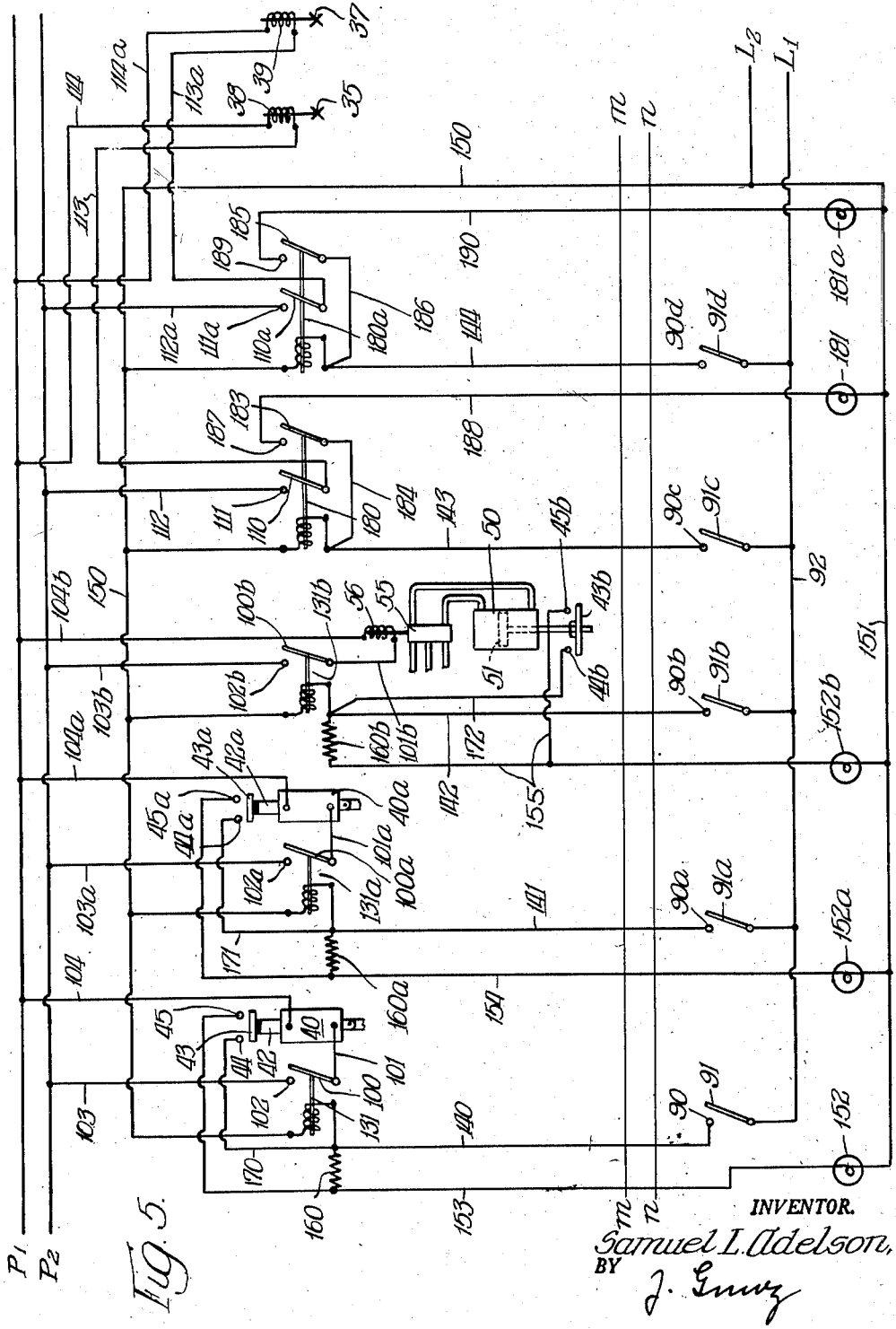
Figure 5 is a wiring diagram for the control system.

The controller comprises a tank 10 of any suitable shape but which is shown in Figure 1 as a cylindrical tank having a bottom 11 and an upstanding wall 12. The bottom 11 may be sloped inwardly to a valved drain 13, as shown. The tank 10 may be open, when the flow to be controlled discharges under gravity, but must be closed when used for controlling the rate of flow of a gas or of liquid discharged under pressure. For purposes of exemplification and illustration the tank 10 is shown in Figure 1 as provided with a cover or lid 15 which may be fastened to the tank 10 by any suitable means, not shown, to provide a fluid tight seal. When using the tank for controlling a liquid, a valved vent 14 is provided to permit the discharge of gas that may be trapped under the cover 15.

The fluid arrives through an inlet conduit 16 which may discharge in the lower part of the tank 10, as shown, and leaves the tank through an outlet 18 which may lead from an upper portion of the tank. The inlet conduit 16 is provided with a control valve 17. When the overall range of flow control is wide, I may provide a plurality of inlet control valves, which may be used alternately or in unison, depending on the programmed rates. For example, up to an overall range of about 40 to 1, one inlet valve will be sufficient. At higher ranges, two or more valves may be used. Such an arrangement is shown in Figure 2, where the valve 17a is connected in parallel with valve 17 on inlet conduit 16 by a by-pass 19, branching off conduit 16 upstream of valve 17 and discharging to conduit 16 downstream of valve 17. Obviously, several valves can be arranged in this manner in parallel with valve 17.

A horizontal partition or dividing plate 20 extends across the tank substantially above the inlet 16 and spaced below the outlet 18 and forms in the tank a lower inlet chamber 21 and an upper outlet chamber 22. A plurality of orifices of suitable diameters are fixed in the dividing plate 20 and afford communication between the chambers 21 and 22. Only three orifices 23, 23a and 23b are shown in Figure 1 for purposes of simplification. However, it should be understood that a greater number is usually provided and that the number used will vary with the range of flow control to be covered and the absolute accuracy required. While orifices of different size are shown, in some cases it will be desirable to use orifices of identical size. For each orifice a sealing member of any suitable kind, such as plates 24, 24a and 24b of Figure 1, is provided, which is adapted to seal the respective orifice. The sealing plates 24, 24a, 24b are fixed to rods 25, 25a, 25b which pass through stuffing boxes 26, 26a, 26b. The stuffing boxes are fixedly and tightly supported by the tank cover 15 and form fluid tight seals around the rods 25. When an open tank is used, the rods can be supported by a bridge or by beams spanning the tank, and in this case, obviously the stuffing boxes will not be needed.

The rods 25 may be operated to raise and lower the sealing plates 24 to open or close the orifices 23 by means of solenoids or hydraulic cylinders. In Figure 1 rods 25 and 25a which are associated with the plates for the relatively small orifices 23 and 23a are shown as connected to the plungers 41 and 41a of solenoids 40 and 40a respectively. Rod 25b which is associated with the plate for the large orifice 23b is connected to the piston 51 of a hydraulic cylinder 50. In the preferred form of my controller the choice between solenoids and hydraulic cylinders is determined by the size of the associated orifice. However, it should be understood, that, if desired, all rods can be operated by solenoids or by hydraulic cylinders.

When using the controller for controlling the rate of flow of a liquid I may provide a suitably perforated distribution plate 27 across the tank at an elevation intermediate the inlet 16 and the partition 20. The plate 27 serves to properly distribute the incoming liquid and eliminate or reduce its turbulence as it approaches an open orifice.

A constant differential regulator 30 is connected to the inlet chamber 21 by a high pressure line 31 and to the outlet chamber 22 by a low pressure line 32. The regulator 30 is set for a predetermined pressure differential across the orifices 23 and adapted to control the inlet valve or valves to the tank 10 to maintain the predetermined differential. Devices of this kind are well known in the art and any device capable of controlling the inlet valve to maintain the differential across the orifices 23 constant may be used. For purposes of illustration one simple form of a pneumatically operating regulator is shown diagrammatically in Figure 3, but it will be understood that other pneumatically or hydraulically operating regulators can be used. Briefly, the regulator 30 comprises a housing 60 of suitable shape which is divided by diaphragms 61, 62 and 63 into an air pressure chamber 64, a low pressure chamber 65 connected to outlet chamber 22 by conduit 32, a high pressure chamber 66 connected to inlet chamber 21 by conduit 31, and a spring chamber 67. The air pressure chamber 64 is connected to a source of air under pressure, not shown, through line 33 and air inlet valve 68, and to the inlet control valve 17 through an air port 69 and a controlled air pressure line 34 provided with a solenoid operated valve 35. The port 69 is also connected to valve 17a by line 36 provided with a solenoid operated valve 37. The valves 35 and 37 have a fully open and a fully closed position which they assume when their solenoids are energized or deenergized, respectively. When valve 35 is in closed position, the air pressure derived from the regulator 30 is cut off from the diaphragm chamber of inlet valve 17, and valve 17 closes. Similarly, when solenoid operated valve 37 is in closed position, the air pressure is cut off from the diaphragm chamber of valve 17a, and valve 17a closes. Whether valve 35 or valve 37 or both valves are open or closed, is determined by the programmer in a manner to be described below. Diaphragms 61 and 63 have equal effective areas, while diaphragm 62 has a larger effective area than the diaphragms 61 and 63. The three diaphragms are connected through their center plates, as shown, to move in unison.

A spring 70 in spring chamber 67 is set to balance the predetermined differential between the pressures in high pressure chamber 66 and low pressure chamber 65. When the pressure differential across the orifices 23 is at the desired value the air inlet valve 68 is throttled to such an extent that the pressure drop therethrough produces in chamber 64 and diaphragm chamber of valve 17 a pressure such that the degree of opening of valve 17 and the flow therethrough are of the proper values to produce this desired differential pressure across orifices 23.

If the differential pressure across the orifices 23 increases, say due to an increase in the pressure of the fluid entering control valve 17 and hence an increase in the flow therethrough, the differential pressure across diaphragm 62 of regulator 30 will be greater than the set tension value of spring 70 and the diaphragm assembly will move in a direction to further throttle valve 68 to decrease the pressure in chamber 64 and diaphragm casing of valve 17. This will cause the inlet valve 17 to move to a more closed position and to reduce the flow therethrough until the differential pressure across the orifices 23 is restored to its predetermined value. The procedure is reversed upon a decrease in the differential pressure from its predetermined value.

Valve 17a functions similarly when its solenoid operated valve 37 is open.

As shown in Figure 4, the flow programmer of my system may comprise a roll 80 of suitable material which is perforated with holes 81 arranged in suitable groups and rows, the location of a perforation in a row corresponding to a definite orifice 23 or to a valve on the flow controller. The roll 80 is threaded in a mandrel 82 and is moved intermittently forwardly by suitable drive means, not shown, over a bar 83 which is provided with openings 84. The openings 84 correspond in number to the maximum number of perforations used in one row of the roll 80. The openings 84 are located in such manner along the bar 83 that each perforation 81 in a row registers with an opening 84 as the roll 80 moves over the bar 83. The forward movement of the roll 80 is controlled by a timer or the like, not shown, in such manner that the roll will stop each time a row of perforations 81 registers with the openings 84 of bar 83.

A vacuum motor 85 of known construction is shown connected to one of the openings 84 in the bar 83 by a line 86. While only one vacuum motor 85 is shown and will be described for simplification, it will be understood that the number of vacuum motors to be provided corresponds to the maximum number of perforations 81 to be used in one row. A line 87 leads from the vacuum motor 85 to a source of vacuum, not shown. The vacuum motor 85 is provided with an extension 88 which is movable with the top of the vacuum motor and with a stationary extension 89 as shown. The extensions 88 and 89 carry a pair of normally spaced contacts 91 and 90 which are suitably connected in an electric circuit to be described below.

When a perforation 81 of the roll 80 registers with an opening 84 of the bar 83, air is admitted to the vacuum motor and the vacuum broken. The movable top of the motor, carrying extension 88 and contact 91, moves upwardly and contacts 90 and 91 are brought together to close an electric circuit.

Figure 5 shows a wiring diagram for my control system. Wiring below line $n$—$n$ represents that at the programming station, while wiring above line $m$—$m$ represents that at the flow controller station, transmission lines connecting the two wiring systems.

The solenoids 40 and 40a and the hydraulic cylinder 50 in the diagram are those shown in Figure 1 as controlling the position of the valve plates 24, 24a and 24b, respectively. Operation of hydraulic cylinder 50 is controlled by a four-way pilot valve 55 which, in turn, is operated by a solenoid 56. Solenoids 38 and 39 operate the valves 35 and 37 of Figure 1. Contacts 90 and 91 are those shown in Figure 4.

A source of electric power $L_1$ and $L_2$ enters the programming station while a source of power $P_1P_2$ enters the flow controller station. It is obvious that the source $P_1P_2$ may be obtained directly from $L_1L_2$ and also that the solenoids 40 and four-way pilot valve 55 may be operated directed instead of through relays, but since the only power supply available may be alternating current and since the inrush current to alternating current solenoids is approximately ten times the holding current and thereby causes a large line voltage drop, it is believed to be more economical to employ relays and light transmission lines rather than the heavy transmission lines necessary to hold the voltage drop down to a permissible value. This diagram therefore is based on the use of alternating current although direct current may also be employed with or without the use of relays.

The plunger of each of the solenoids 40 and 40a is provided with an extension 42 or 42a carrying an insulated contact bar 43 or 43a, respectively, so that when the solenoid is in the closed position the contact bar 43 or 43a bridges the contacts 44 and 45 or 44a and 45a, respectively. The piston of the cylinder 50 carries an insulated bar 43b which when the piston 51 has reached the upper limit of its stroke will bridge the contacts 44b and 45b.

To the line $L_1$ of the source of power supply at the programming station are connected the contacts 91 to 91d inclusive by a common header 92. Contact 90 is connected to one terminal of the coil of a relay 131 by conductor 140. Contacts 90a, 90b, 90c and 90d are connected to one terminal of the coils of relays 131a, 131b, 180 and 180a by conductors 141, 142, 143 and 144 respectively. The other terminals of the relay coils are connected to a common conductor 150 and thence to the line $L_2$ of the source of power supply.

One terminal of each of the lamps 152, 152a and 152b is connected to a common header 151 leading to power line $L_2$. The other terminal of each of the lamps 152, 152a and 152b is connected to contacts 45, 45a and 45b, respectively, and to one terminal of each of suitable resistors 160, 160a and 160b by conductors 153, 154 and 155, respectively.

The other terminals of the resistors 160, 160a and 160b are connected to contacts 44, 44a and 44b by conductors 170, 171 and 172, respectively, and also to conductors 140, 141 and 142, respectively.

Relays 131 are of the single pole type and relays 180 are of the double pole type. Line 143 is connected to pole 183 of relay 180 by conductor 184 and line 144 is connected to pole 185 by conductor 186. One terminal of each of the lamps 181 and 181a is connected to the common header 151. The other terminal of lamp 181 is connected to the contact 187 of relay 180 by conductor 188 and the other terminal of lamp 181a is connected to contact 189 of relay 180a by conductor 190.

One terminal of solenoid 40 is connected to pole 100 of relay 131 by conductor 101. Contact 102 of relay 131 is connected to power supply line P₂ by conductor 103. The other terminal of solenoid 40 is connected to power line P₁ by conductor 104.

One terminal of solenoid 40a is connected to pole 100a of relay 131a by conductor 101a. Contact 102a of relay 131a is connected to power supply line P₂ by conductor 103a. The other terminal of solenoid 40a is connected to power line P₁ by conductor 104a.

One terminal of coil of solenoid 56 of four way pilot valve 55 is connected to pole 100b of relay 131b by conductor 101b, contact 102b of relay 131b is connected to power supply line P₂ by conductor 103b. The other terminal of the coil of solenoid 56 is connected to power line P₁ by conductor 104b.

One terminal of the coil of solenoid 38 of shut off valve 35 is connected to pole 110 of relay 180 by conductor 113. Contact 111 of relay 180 is connected to power line P₂ by conductor 112. The other terminal of the coil of solenoid 38 is connected to power line P₁ by conductor 114.

One terminal of the coil of solenoid 39 of shut off valve 37 is connected to pole 110a of relay 180a by conductor 113a. Contact 111a of relay 180a is connected to power line P₂ by conductor 112a. The other terminal of the coil of solenoid 39 is connected to power line P₁ by conductor 114a.

In operation, say contacts 90 and 91 of Figures 4 and 5 are closed because a perforation in the roll 80 aligned with its corresponding opening in the bar 83. Current will then flow from line L₁ through contacts 91 and 90, conductor 140, coil of relay 131, to conductor 150 back to power line L₂. This will energize the coil to close a circuit from power line P₂, conductor 103, contact 102, pole 100, line 101, solenoid 40 and line 104 to power line P₁. The solenoid will be energized to raise the plate 24 off the orifice 23 (Fig. 1) and permit passage of water at a rate corresponding to the diameter of the orifice and the set differential head.

If the plunger 41 of solenoid 40 moves through its full stroke, or as commonly expressed, seals, then contact bar 43 on plunger extension 42 will bridge the contacts 44 and 45.

The lamp 152 will then be lighted at its full intensity, the circuit being as follows: from power line L₁, through contacts 91 and 90, conductors 140 and 170, contact 44, contact bar 43, contact 45, conductor 153, lamp 152, conductor 151 to power line L₂.

If, however, the plunger 41 shall not seal, or not move at all, the resistance 160 will then be in series with the lamp 152 as the contacts 44 and 45 will not be bridged. As the value of this resistor is so chosen that when it is in series with the lamp, the lamp will be dimly lighted, it will be noticed that although the program called for this orifice to open it either has not done so, or that the plunger has not sealed and there is danger of it burning out. Obviously, since each of the lamps 152, 153a etc. is associated with a definite orifice whose flow rate is known, the digression from the programmed flow rate caused by failure of the orifice to open can be computed.

The circuit is as follows: power line L₁, contacts 91 and 90, line 140, resistor 160, line 153, lamp 152, conductor 151 to line L₂.

The action will be alike for all solenoid operated orifices and valves. With cylinder operated orifices, if the piston does not move or make its full stroke, contacts 44b and 45b will not be bridged and the corresponding lamps will be dimly lighted.

It is obvious that while the operation has been given for one solenoid or one cylinder operated orifice, the action will be the same and occur simultaneously for each of a plurality of solenoid and cylinder operated orifices which the programmed perforations on the roll 80 may call for, and also for the solenoid operated valves 35 and 37. Resistors for the indicating lamps 181 and 181a associated with valves 35 and 37 are not shown, but may be provided if desirable. In each row of perforations on roll 80 perforations controlling opening or closing of the solenoid operated valves 35 and 37 will be provided to open either or both of these valves in accordance with the number and size of the orifices to be opened by perforations in that row.

It will be seen from the above description that the flow control system of my invention is adapted to operate with great accuracy and repetitiveness over a wide range of flow rates and with widely varying flow rates. It will also be obvious to those skilled in the art that many modifications of the apparatus shown for purposes of exemplification and illustration may be made without departing from the scope and spirit of the invention. Thus it will be understood that the programmer need not be in the form described and shown in Figure 4. Any device capable of selectively opening or closing one or more of the orifices 23 as required by a flow program may be used. However, when the range of flow rates is wide and the accuracy required is high, I prefer to use the new programmer described, as it is especially suited for such requirements.

I claim:

1. In a flow control system including a controller, a programmer and electrical means for transmitting a program from the programmer to the controller, an improved controller comprising a tank, an inlet into said tank, an outlet from said tank functionally remote from said inlet, a partition in said tank intermediate said inlet and said outlet, a plurality of orifices in said partition, means adapted to maintain a predetermined pressure difference between the upstream and downstream side of said orifices, and means associated with said orifices for selectively opening or closing one or more of said orifices to provide flow rates in accordance with the flow program set by said programmer, said last mentioned means being operated by said electrical transmitting means.

2. A flow control system including a controller, a programmer and electrical means for transmitting a program from the programmer to the controller, said controller comprising a tank, an inlet into said tank, an outlet from said tank remote from said inlet, a partition across said tank intermediate said inlet and said outlet, a plurality of orifices in said partition, means adapted to maintain a predetermined pressure difference between the upstream and downstream side of said orifices, said means including a pressure differential responsive device connected to said tank on the upstream side and on the downstream side of said orifices, a fluid pressure operated control valve associated with said inlet, a pressure fluid connection from said pressure differential responsive device to said control valve, said pressure differential responsive device establishing in said fluid connection a pressure which varies inversely to variations in the pressure difference between the upstream and the downstream side of said orifices, means including a solenoid operated valve on said pressure fluid connection for closing said control valve independently of the pressure differential responsive device, and means associated with said orifices for selectively opening or closing one or more of said orifices to provide a composite flow rate varying in accordance with the flow program set by said programmer, said solenoid operated valve and said last mentioned means being positioned by said electrical means.

3. The apparatus of claim 2, including also means associated with said pressure differential responsive device adapted to balance a predetermined pressure difference between the upstream side and the downstream side of said orifices.

4. A control system adapted to automatically control rates of fluid flow in accordance with a remotely set program, said system including a programmer, a controller comprising a tank having an inlet and an outlet functionally remote from said inlet, a partition interposed between said inlet and said outlet, orifices in said partition, a sealing member associated with each orifice, and a solenoid operatively connected with each sealing member and adapted to move said member to open and close its orifice, and a power circuit from said programmer to each solenoid, a switch in each power circuit, said switches being positioned by said programmer in accordance with the rate of flow program, a control valve on said inlet, and regulating means connected to said control valve for setting said control valve to maintain a predetermined differential between the upstream and downstream side of said orifices.

5. A control system adapted to control the rate of flow of a fluid in accordance with a predetermined program, comprising a tank, an inlet into said tank, an outlet from said tank functionally remote from said inlet, a partition in said tank intermediate said inlet and said outlet, a plurality of orifices of different size in said partition, means including an inlet control valve and a pressure differential sensitive device adapted to maintain a predetermined pressure drop across said orifices, a sealing member for each of said orifices, electrical means operable to selectively hold one or more sealing members in sealing position and to move them into, and hold them in, non-sealing position relative to said orifices, said electrical means being connected in a programmed power circuit.

6. A fluid flow control system comprising a tank having an inlet and an outlet functionally remote from said inlet, a partition interposed in the line of flow from said inlet to said outlet, a plurality of orifices in said partition, a pressure differential responsive device, said pressure differential responsive device being connected to said tank upstream of said orifices and downstream thereof, an inlet valve associated with said inlet and adapted to be positioned by said pressure differential responsive device, biasing means associated with said pressure differential responsive device and adapted to balance a predetermined pressure differential acting on said device, a sealing plate for each of said orifices, rods affixed to said plates and extending to outside said tank, and means for selectively moving one or more of said rods to hold their associated sealing plates in sealing relation with the orifices or to move them into, and hold them in, non-sealing position, electrical means controlling the operation of said last mentioned means, and a programmer operating said electrical means in accordance with a predetermined flow program.

7. The apparatus of claim 6, wherein at least one of said rods is moved by hydraulic means.

8. The apparatus of claim 6 wherein at least one of said rods is moved by electrical means.

9. A fluid flow control system comprising a tank having a fluid inlet and a fluid outlet functionally remote from said inlet, a partition interposed in the line of flow from said inlet to said outlet, a plurality of orifices through said partition, means associated with said tank and adapted to maintain a predetermined pressure difference between the upstream side and the downstream side of said orifices, and means for automatically opening and closing selected orifices in accordance with programmed rates of flow, said means including a sealing member for each of said orifices, solenoids operatively connected with said sealing members, a roll of flexible material perforated in accordance with the flow program, each perforation in a row of perforations corresponding to a definite orifice in the partition, a slotted bar, said roll being adapted for intermittent forward movement over said bar and alignment of successive rows of orifices with the slots of said bar, an electric switch for each of said orifices, means operative to close the switch of an orifice when a perforation corresponding to such orifice is aligned with a slot of said bar, and a power circuit closed by closing of the switch and including the solenoid of the respective orifice sealing member.

10. An apparatus according to claim 9 wherein said means for maintaining a predetermined pressure difference includes a pressure differential sensitive member connected to said tank upstream and downstream of said orifices, plural inlet control valves associated with said inlet, a pressure fluid connection between said pressure differential sensitive member and each of said inlet control valves, and a solenoid operated valve on each of said pressure fluid connections, and wherein means are provided for selectively opening either one or more of said solenoid operated valves, said means including additional perforations on said roll corresponding to said solenoid operated valves, an electric switch for each solenoid operated valve adapted to close when a perforation corresponding to the respective valve registers with a slot in said bar, and a power circuit closed by closing of the valve switch, the solenoid of the respective valve being connected in said power circuit.

11. Apparatus according to claim 9, including also a signal means for each orifice, said signal means being connected to said power circuit and operative to indicate opening of said orifices.

12. Apparatus according to claim 11 wherein said signal means are so connected to said power circuit as to give one signal when an orifice opens according to program, and a different signal when an orifice fails to open according to program.

13. A fluid flow controller adapted to control rates of fluid flow in accordance with a flow program, comprising a tank, an inlet into said tank, an outlet from said tank functionally remote from said inlet, a partition in said tank interposed between said inlet and said outlet, orifices in said partition, sealing members for said orifices, means for selectively operating said sealing members to open and close selected orifices according to a flow program, means for maintaining a constant predetermined pressure difference between the upstream side and the downstream side of said orifices, said last mentioned means comprising a pressure differential sensitive device set for the predetermined pressure difference, a plurality of inlet control valves connected in parallel to said inlet, pressure fluid conduits connecting said pressure differential sensitive device to said inlet valves, valves in said conduits, and means to selectively open one or more of said valves in accordance with said program, a programmer, and electrical means operated by said programmer and operating said sealing members and said means for selectively opening one or more valves.

SAMUEL L. ADELSON.

REFERENCES CITED

The following references are of record in the file of this patent:

UNITED STATES PATENTS

| Number | Name | Date |
|---|---|---|
| 2,157,707 | Keel | May 9, 1939 |
| 2,343,375 | Herman | Mar. 7, 1944 |
| 2,484,916 | Tucker | Oct. 18, 1949 |

FOREIGN PATENTS

| Number | Country | Date |
|---|---|---|
| 791,223 | France | of 1935 |